Jan. 17, 1967 L. PLAMBECK, JR 3,298,895

PROCESS FOR PRODUCING IMAGES AND PRODUCTS THEREOF

Filed Dec. 17, 1962

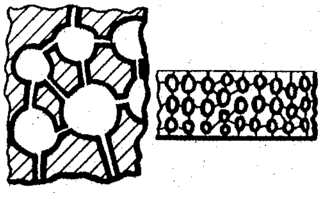

(1) PROVIDING AN OPAQUE, PRESSURE-SENSITIVE LAYER OF AN ORGANIC POLYMER HAVING MICROSCOPIC OPEN CELL PORES WHICH CONTAIN OPTICALLY DENSE MATERIAL.

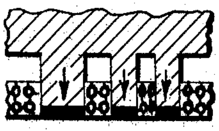

(2) COLLAPSING SAID PORES (E.G., BY APPLYING PRESSURE) IN SELECTED AREAS OF SAID LAYER.

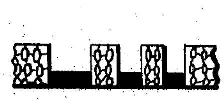

(3) REMOVING OPTICALLY DENSE MATERIAL FROM THE PORES.

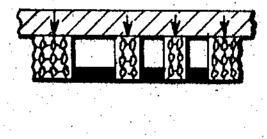

(4) COLLAPSING THE PORES FROM STEP (3) (E.G., BY APPLYING PRESSURE) TO YIELD:

(5) A LAYER WITH COLLAPSED AREAS CONTAINING OPTICALLY DENSE MATERIAL AND COLLAPSED AREAS FREE FROM SUCH MATERIAL.

*INVENTOR*
LOUIS PLAMBECK, JR.

BY Lynn Barratt Morris
*ATTORNEY*

United States Patent Office 3,298,895
Patented Jan. 17, 1967

3,298,895

PROCESS FOR PRODUCING IMAGES AND PRODUCTS THEREOF

Louis Plambeck, Jr., Wilmington, Del., assignor to E. I. du Pont de Nemours and Company, Wilmington, Del., a corporation of Delaware Filed Dec. 17, 1962, Ser. No. 244,902
8 Claims. (Cl. 161—160)

This invention relates to a process for producing images by pressure. More particularly, it relates to such a process for producing optically dense positive images in open cell, opaque, porous, pressure-sensitive films.

Opaque films of hydrophobic vinyl-type polymers which have open-cell voids and which are clearable to substantial transparency upon removal of the light scattering open-cell porosity, e.g., by application of pressure, have been described in U.S. 2,957,791. Films of this general type have many uses. One that now has considerable technical importance is described in assignee's Bechtold U.S. application Ser. No. 63,953, filed October 21, 1960, now Patent No. 3,149,967. This involves the use of a selectively cleared opaque film in the printing industry. For this utility, as well as other potential applications in storing and reproducing information, thin films of high dimensional stability are of great importance. A means of obtaining such a product has been to deposit an adherent thin, porous, opaque layer of pressure-clearable polymeric material upon a base film that combines strength, flexibility, dimensional stability (particularly at elevated temperatures), transparency, and inertness to a high degree, such as of the oriented polyester type. When a relief or printing form, e.g., type face, or halftone engraving, is contacted with the opaque layer, portions that are subjected to pressure become clear. The resulting image-bearing film contains substantially transparent portions along with the white opaque portions that were not subjected to pressure, thus producing a "negative." Although the images thus obtained are of considerable utility for the preparation of printing elements from photo-sensitive plates by directing light through the image-bearing film directly onto an unexposed or raw photosensitive plate material, for some graphic art uses, such as in the preparation of offset lithographic plates, a direct positive would be advantageous, since in combination with a single photographic step it would provide a method of lateral reversal without printing through the base.

It is an object of this invention to provide a new process for producing optically dense images in opaque, porous pressure-sensitive image-yielding films. Another object is to provide such a process which yields positive images. A further object is to provide such processes which are simple and yield positive images of good quality. Still other objects will be apparent from the following description of the invention.

The positive image-forming process of this invention comprises (1) providing an opaque, pressure-sensitive layer of an organic polymer having open cell pores of microscopic size, said pores containing optically dense material, (2) sealing said optically dense material in selected areas of the aforesaid layer by collapsing the pores in said areas, (3) removing the optically dense material in the remaining areas of said layer, and (4) collapsing the pores in the said remaining areas, thereby clearing said areas and leaving an optically dense image in the selected areas. In the process, step (2) is preferably carried out by impacting pressure.

The process that is described above is illustrated in the flow sheet of the accompanying drawing where the nature of the layer is described for each step and the nature of the final product 5 is given.

The opaque, porous films useful for the preparatiton of image-bearing films are those that can be selectively cleared by pressure, heat, or solvents. The films are characterized by opacity, open-celled porosity, low-bulk density, and ease of clearing into areas having high light transmission, i.e., low opacity, with loss of porosity. Preferred opaque films are described in U.S. Patent 2,957,791 and in application Ser. No. 63,953, filed Oct. 21, 1960. These films are composed of hydrophobic polymers, generally of the vinyl type, and especially of polymers containing major amounts of vinyl chloride or vinylidene chloride, that soften or distort at above 50° C. and usually not over 125° C. The porosity is substantially uniform with a pore diameter generally less than a micron and with a major part less than 0.5 micron. The opaque film becomes transparent when pressures of 10,000 lb./sq. in. are applied.

The opaque layers useful in this invention have a thickness between 0.1 to 5 mils and usually less than 1.5 mils. The preferred thickness of the opaque layer is 0.2 to 0.8 mil. The opaque film generally has a bulk density of 0.4 to 0.5 g./ml. or less. Upon clearing, e.g., by heat or pressure, the bulk density becomes substantially that of the transparent polymer itself, i.e., about one, or higher.

Opaque, pressure-sensitive films especially useful in the process of the invention are opaque, porous films of a vinyl-type addition polymer containing within the pores an acid dye in the form of a salt with a cationic surface-active agent as the optically dense material.

The opaque film is preferably employed as an adherent coating on a substantially transparent, non-fibrous base film that has strength, flexibility, dimensional stability, and inertness to temperature changes and most organic and inorganic materials. A suitable base support is of the oriented polyester type, e.g., polyethylene terephthalate. The film should be relatively thin, i.e., have a thickness of 0.5 to 7 mils, preferably within the range of 1–4 mils.

Opaque films that have open-celled pores and that are useful for the process of this invention, although generally obtained as described in assignee's U.S. Patent 2,957,791, and Stevenson application Ser. No. 176,134 filed Feb. 27, 1962 (which application was refiled as continuation-in-part application Ser. No. 381,652 on July 10, 1964) can also be prepared by other methods, e.g., by exposing one side of a clear film of undrawn polyethylene terephthalate to dimethylforamide followed by washing with water and drying. Furthermore, a coating of a polymer on a transparent film base can be treated with a solvent for the coating followed by treatment with a non-solvent. The requirement for the opaque film is physical in nature, e.g., porosity, ability to be cleared by pressure, heat and/or solvents, rather than chemical composition or method of preparation.

The opacity of the films is due to the high volume of pores of small size with their property of scattering light. Collapse or removal of the pores by application of energy such as pressure and heat, or solvents, gives clarification or transparency. Conditions for the clearing of porosity (or opacity) are generally chosen to prevent dimensional change of the base support even though the thickness of the opaque layer is reduced through any clearing techniques.

For the preparation of the positive images by the process of this invention, a removable coloring material, i.e., pigment, metal or dye is impregnated within the open-cell pores of the opaque polymer film. This coloring agent is selected to have in relatively thin deposits the desired property of color or optical density at desired light wave lengths. Suitable agents are water-soluble dyes, preferably acid dyes which form aqueous impregnating solutions containing 5–15% of dye. The dye should be readily absorbed or deposited in the pores and readily removed. Generally acid dyes of 20 or more carbons per molecule and molecular weight of 300 or more can be used providing they are in a soluble form or can be readily removed. In addition to soluble dyes, pigments, metals, or other coloring agents can be formed in situ in the pores. The only requirement, in addition to their optical density, is that they can be removed from the pores in which they are deposited by simple techniques that do not destroy the substrate polymer or film base. Useful materials thus include dyes or inks that are soluble in water or alcohols or similar solvents that do not dissolve the porous polymer of the film or film base. Vat dyes in the water-soluble leuco form can be applied and then oxidized to the insoluble colored form in the pores. Examples of other coloring agents include metals such as silver and pigments such as lead chromate.

In the next step, the selected portions of the opaque porous film containing the coloring agent are subjected to pressure or heat and the open-cell pores are collapsed. This results in a decrease in relief of the film and substantial removal of the open-cell pores initially responsible for opacity by virtue of their light-scattering properties. The coloring agent within these selected areas is sealed by collapse of the open-celled pores. Any "clarification" technique can be employed, e.g., pressing the film against type face such as electrotype or letterpress printing forms. Other methods of removing the porosity from selected areas include typing, use of stylus, pen containing solvent (generally a non-solvent for coloring material), radiant or microwave energy.

After the pores are collapsed in the selected areas, the coloring agent is removed from remaining areas. Conventional methods employed include the use of a mild solvent such as water for the dye. The addition of surface-active agents aids in the removal of many coloring materials.

Thus a strong aqueous solution of an anionic dispersing agent may be used to solubilize and remove acid dyes that have been made water insoluble by conversion to a salt of a long-chain organic base, e.g., as by reaction with a cationic dispersing agent, an aryl guanidine, etc. Similarly salts of basic dyes and anionic dispersing agents may be removed by treatment with an aqueous solution of a cationic dispersing agent. Other solubilizing or chelating agents can be used. For some of the coloring agents, other techniques can be employed such as destruction of the coloring agent by selected reagents such as reducing or oxidizing agents. The specific techniques depends upon the specific coloring agent employed.

After removal of the coloring materials from the open-cell pores that remain, they are cleared by use of a solvent, heat or pressure that is sufficient to remove the porosity and opacity without deterious effects on the film base or dissolving the polymer to a substantial extent. The resulting product is substantially transparent except where the coloring agent remains in the areas in which it had been sealed by the first application of suitable clearing method such as pressure or heat.

The product thus obtained is a direct positive of the areas selectively cleared. Since no opaque pores remain, the image is not destroyed by rough treatment, such as scratching or further applications of heat or pressure.

The following examples further illustrate this invention.

*Example I*

A film having a porous, white layer (optical density to white light about 0.30 Welch Densichron) of about 0.4 mil thickness of a copolymer of vinyl chloride with methyl acrylate in about 3/1 to 4/1 mole ratio on a polyethylene terephthalate film base of about 2-mill thickness was rinsed in an aqueous detergent solution containing about 0.04% of a triethanolamine salt of mixed dodecyl sulfate and octadecenyl sulfate, then allowed to dry. This film was then immersed in about 1% solution of Malachite Green dye (Colour Index No. 42000), the excess solution blotted from the surface and the film allowed to dry.

The resulting opaque, green film was marked on with a stylus to coalesce the porous coating in selected areas. This furnished a transparent green image on a deep green opaque background, i.e., a negative. When this film was washed in water, the dye in the non-coalesced opaque portions was largely removed. After the film was dried, as image of deep green transparent lines on a pale green opaque background was obtained. By reflected light, this was a positive, but by transmitted light, it was still a negative because of the opacity imparted by the porous, light-scattering structure of the coating. However, when this film was placed for a few seconds in the vapor above boiling acetone, the opaque portions became clear. The film then showed deep green transparent lines on a very light green transparent background.

The above procedure was repeated using a 9% aqueous solution of a black afterchromed dye (Colour Index No. 15710) instead of the Malachite Green solution. A dark gray image on a light gray background was obtained.

*Example II*

A sheet of coated film similar to that described in Example I, but carried on a 1 mil polyethylene terephthalate base, was treated with a 15% aqueous solution of a Nigrosine black dye of Colour Index No. 50420, wiped with a 1% aqueous solution of $Al_2(SO_4)_3 \cdot 18H_2O$, washed in water and dried. This procedure is further described in Cline application Serial No. 176,814, filed Mar. 1, 1962 of assignee. By this treatment, the optical density of the film to white light (Welch Densichron) was increased from 0.35–0.42 to over 4.5.

The thus dyed film was clarified against a letterpress printing plate by a multiple impact method whereby the density in the clarified area was reduced to 2.6–2.8 because of the reduction of scattering. The film was then washed for a few minutes in a 5% aqueous solution of the tetrasodium salt of ethylenediamine tetraacetic acid, rinsed thoroughly in water, and dried. The treatment with the chelating agent removed aluminum ion from the insoluble aluminum-dye complex in the still porous areas, allowing the dye to be removed from the layer in the subsequent washing operation. In the coalesced areas, the dye salt was protected by the polymeric film compacted around it and consequently was not removed. Treatment of the washed and dried film in hot acetone vapor caused coalescence of the remaining opaque areas. The resulting image was a positive having dark portions with an optical density of 2.20–2.30 and a background density of about 0.6.

A second positive image was prepared in exactly the same manner except that a 9% aqueous solution of an afterchromed black dye (Colour Index No. 15710) was used instead of the Nigrosine. In this case, the optical density of the dark portion of the resulting positive image was 2.06–2.15 while the background portion had a density of 0.20–0.25 reflecting the easier removal of the dye molecules of Colour Index No. 15710 compared to the Nigrosine.

*Example III*

A film of the type described in Example I having a white porous 0.2-mil layer of the vinyl chloride/methyl acrylate copolymer on a 2-mil polyethylene terephthalate base was immersed in a saturated solution of Malachite Green dye, removed, and excess surface dye solution removed by squeegeeing. The film was allowed to dry, dipped in a 6% aqueous solution of an organic alkyl aryl sulfonate to form an insoluble dye salt, washed thoroughly in water and dried. The dye treatment increased the optical density of the film from 0.12 to 0.47 (white light). The optical density of the film to red light was over 2.5.

The dyed film was clarified against a printing plate by a multiple impact method and then was treated for about one minute in a warm 2% aqueous solution of stearyl dimethylbenzylammonium chloride. The dye in the uncoalesced porous areas was rapidly solubilized and was essentially completely removed from the areas in a subsequent washing operation. The film was dried and treated in acetone vapor to coalesce the porous polymer remaining in the undyed areas. The result was a transparent blue-green positive image on an essentially colorless transparent background. The optical density (red light) of the dark portions was 1.70–1.80 while the background had a density in the 0.05–0.14 range.

In a similar manner, a magenta positive image was prepared using a film dyed with a 0.75% aqueous solution of Colour Index No. 42510. In this case, the dark portions had an optical density (green light) of 1.35–1.40 on a background with a density of 0.05–0.07.

*Example IV*

A strip of the film carrying a white porous layer of vinyl chloride/methyl acrylate copolymer as described in Example I was treated with an 0.13% aqueous solution of stearyl dimethylbenzylammonium chloride for 10 minutes, the excess solution squeegeed from the surface, and the film dried. The dry film was then swabbed with a 0.5% aqueous solution of an Ink Blue dye of properties corresponding to Colour Index Nos. 42755 and 42780 for one minute, rinsed in running water for 30 seconds, and dried. The film was clarified against an electrotype in a ball-jogger clarifying machine (see Inland Printer/American Lithographer 149, No. 2, 92 (May 1962)). The dye optical density (white light) in the clarified areas was 0.51–0.53. The clarified film was agitated in a 1% aqueous $Na_2SO_3$ solution for five minutes, then rinsed in water for 1½ minutes, and dried. The sulfite solution bleached the dye in the porous areas leaving a clear blue positive image on a white background. When the film was immersed in acetone vapor, a blue positive image on an essentially colorless background was obtained.

*Example V*

A white porous coating on film as used in Example IV was treated with a 0.5% aqueous solution of stearyl dimethylbenzylammonium chloride for five minutes, excess solution squeegeed off, and the film dried. Such a dried film was dyed in a saturated solution of dye of Colour Index No. 42685 for one minute, dried, rinsed in water to remove any excess dye, then dried again.

The treated film was clarified against an electrotype as described in Example IV, treated in a 6% aqueous solution of an organic alkyl aryl sulfonate for about 30 seconds, rinsed in water and dried. A transparent magenta image on a white background was obtained. The remaining white opaque areas were clarified by placing the film for a few minutes on a hot plate maintained at 130–140° C. The optical density of the magenta positive image (green light) was 0.55 while the colorless background had a density of 0.04.

An additional portion of the film impregnated with the cationic dispersing agent was treated with a saturated solution of Tartrazine dye to give a deep yellow film. This was clarified against an electrotype as above, washed in the alkyl aryl sulfonate solution, rinsed in water, and dried to give a yellow positive image on a white background. The white porous portion was coalesced and clarified by placing the film for a few minutes in a closed container containing a small amount of methylene chloride.

A film prepared as in Example IV with Ink Blue as the dye was clarified against an electrotype and the dye in the uncoalesced areas removed by treatment with the alkyl aryl sulfonate solution. The porous, white areas in the film were then clarified by treating the film with a fog of a 2–1 (by volume) mixture of acetone and methyl isoamylketone applied from a nebulizer-type sprayer. The optical density of the positive image (orange light) was 1.20–1.30 while the clear background had a density of 0.04.

*Example VI*

A film carrying a white porous layer as in Example I was treated with a sepia sensitizer solution (Ag salt-ferric ammonium citrate) and allowed to dry. The dry film was exposed to sunlight to develop a brown-silver deposit in the pores of the layer, rinsed in water to remove any soluble salts and surface deposits, and dried. The thus colored film was clarified against a printing plate by a multiple impact method, then placed momentarily in Farmer's reducer, rinsed in water and dried. The fine grained photolytic silver in the porous areas of the film was dissolved rapidly by the reducing solution without noticeable attack on the silver in the coalesced areas. The white background was clarified by treatment with acetone vapor to leave a sepia positive image (optical density to blue light 0.85–1.0) on a colorless transparent background (optical density 0.03).

*Example VII*

The white porous layer of a film as described in Example I was treated with a 10% ethanolic solution of a spirit-soluble black dye (Colour Index Solvent Black 17) and allowed to dry. The dyed film was clarified against an electrotype in a ball jogger machine and then treated for a few minutes in a 6% aqueous solution of an alkyl aryl sulfonate, rinsed in water, and dried. The remaining porous areas were clarified by subjecting the film to hot acetone vapor for a few seconds. The result was a dark gray positive image (optical density to white light 0.50–0.60) on a light gray transparent background (optical density 0.15).

*Example VIII*

A film treated with stearyl dimethylbenzyl-ammonium chloride and a magenta dye (Colour Index No. 42685) as described in Example V was placed in a commercial thermographic copying machine in contact with an original carrying a test written in pencil. The dyed film and the original were arranged so that the high intensity light passed through the dyed film before striking the original. On passage through the machine the portions of the film adjacent to the text were clarified by the heat. When the film was treated in a 6% aqueous solution of an alkyl aryl sulfonate, the dye in the non-clarified areas was solubilized and largely removed in a subsequent rinse. After dying, the film was completely clarified by treatment in acetone vapor. The result was a dark magenta image on a light magenta background. Thus, in the heat clarified area the dye is protected from the solubilizing reagent hence is not as easily removed as dye in the non-clarified areas.

The opaque porous film containing the optically dense coloring material that is particularly preferred for formation of positive images contains a water-insoluble salt of an acid dye and a large organic cation. By the term "acid dye" is included those having carboxylic or sulfonic acid groups (see Lubs, "The Chemistry of Synthetic Dyes and Pigments," Reinhold, 1955, page 144). A film containing such a dye salt evenly distributed in the pores is readily obtained by in situ reaction of the dye with a cationic dispersing agent. This type of dispersing agent is generally first applied to the porous film and surface deposits removed before treatment with the dye. After contact with the acid dye, a bulky, insoluble complex of the cationic dispersant and acid dye is formed within the pores. A large excess of the dye complex in and/or upon the porous film is to be avoided since the "sealing" of the dye by pore-collapsing treatments is not as readily attained and the resultant positive may not be of the high quality obtained with slightly smaller amounts of dye. For best results less than 50% of the pore volume should be occupied by the dye complex. (Pore volume can be estimated by measuring the thickness of the porous film, then treating the film in solvent vapor to clarify the layer, drying and measuring the thickness a second time.) The solubility of most acid dyes and cationic dispersing agents in water is usually low enough that there is no possibility of exceeding this loading if only a single precipitation step is used. If adequate optical density (i.e., above 1.0–1.5) is not attained in a single step, additional treatment with cationic dispersing agent and acid dye may be required. However, in no case should the loading exceed 50% of the pore volume.

The preferred acid dyes used to form the complex should have molecules of such a size that they can be removed when desired, i.e., they should not become mechanically entangled in the small pores of the film. Because of variations in the film pore size, it is difficult to specify exactly the maximum size of the dye molecule. However, the suitability of a dye for any lot of film is easily determined by impregnating the film with an aqueous solution of the dye in question, drying the dyed film, and then washing the dyed film in water. Under these conditions the preferred dyes are removed almost completely. The optical density of such a dyed and washed film after clearing in solvent vapor should be less than 0.2.

The final direct positives obtained as described above are useful in the field of graphic arts, i.e., production of printing plates. The final film as obtained does not have porosity and is relatively insensitive to damage such as scratching, pressure, heat or solvent effects as compared to similar films that have residual opacity due to pores.

An advantage of the invention is that it is simple and dependable and enables one to obtain positive images directly. Another advantage is that the image-forming material can be readily prepared. A further advantage is that dense, durable, positive images can be obtained in a short time. Still other advantages will be apparent to those skilled in the art from the foregoing description.

I claim:

1. An opaque pressure-sensitive element comprising a transparent film base bearing a thin, adherent, opaque, pressure-sensitive layer, said layer comprising an organic polymer having open cell pores of microscopic size, said pores containing a salt of an acid dye with a cationic surface-active material.

2. The element of claim 1 in which said polymer is a vinyl addition polymer.

3. A positive image-forming process which comprises (1) providing an opaque, pressure-sensitive layer of an organic polymer having open cell pores of microscopic size, said pores containing removable, optically dense material, (2) sealing said optically dense material in selected areas of the aforesaid layer by collapsing the pores in said areas, (3) removing the optically dense material in the remaining areas of said layer, and (4) collapsing the pores in said remaining areas, thereby clearing said areas and leaving an optically dense image in the original selected areas of step (2).

4. A process according to claim 3 wherein the collapsing of the pores in step (2) is by means of mechanical pressure.

5. A process according to claim 3 wherein the collapsing of the pores in steps (2) and (4) is by means of mechanical pressure.

6. A process according to claim 3 wherein the collapsing of the pores in step (4) is by means of a partial solvent for said polymer.

7. A process according to claim 3 wherein said polymer is a vinyl addition copolymer.

8. A process according to claim 3 wherein said polymer is a vinyl addition copolymer and said optically dense material is a salt of an acid dye with a cationic surface-active agent.

References Cited by the Examiner

UNITED STATES PATENTS

| | | | |
|---|---|---|---|
| 1,394,270 | 10/1921 | Brandenberger | 264—54 X |
| 2,739,909 | 3/1956 | Rosenthal | 117—161 |
| 2,846,727 | 8/1958 | Bechtold | 264—49 |
| 2,957,791 | 10/1960 | Bechtold. | |

DONALD J. ARNOLD, *Primary Examiner.*

EARL M. BERGERT, ALEXANDER H. BRODMERKEL, *Examiners.*

L. T. PIRKEY, P. E. ANDERSON, *Assistant Examiners.*